July 31, 1956 F. SCHYTIL ET AL 2,756,986
ROASTING SULFIDE ORES
Original Filed March 21, 1952 3 Sheets-Sheet 1
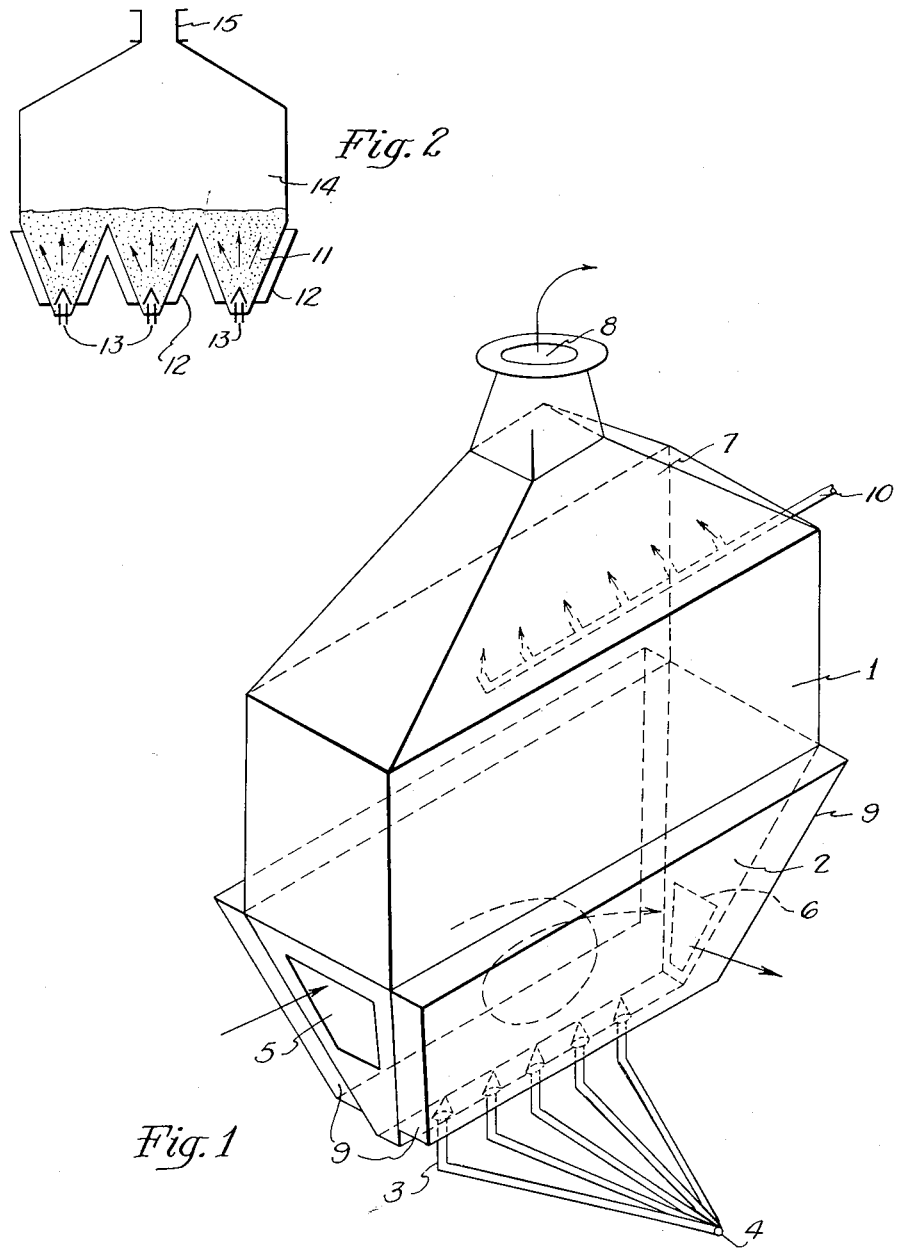
INVENTORS
Franz Schytil
Hellmut Ley
BY Bailey, Stephens & Huettig
ATTORNEYS July 31, 1956  F. SCHYTIL ET AL  2,756,986
ROASTING SULFIDE ORES
Original Filed March 21, 1952  3 Sheets-Sheet 2

INVENTORS
Franz Schytil
Hellmut Ley
BY
Bailey, Stephens & Huettig
ATTORNEYS

July 31, 1956   F. SCHYTIL ET AL   2,756,986
ROASTING SULFIDE ORES

Original Filed March 21, 1952   3 Sheets-Sheet 3

INVENTORS
*Franz Schytil*
*Hellmut Ley*
BY
*Bailey, Stephens & Huettig*
ATTORNEYS

2,756,986

Patented July 31, 1956

2,756,986

ROASTING SULFIDE ORES

Franz Schytil and Hellmut Ley, Frankfurt am Main, Germany, assignors to Metallgesellschaft Aktiengesellschaft, Frankfurt am Main, Germany Original application March 21, 1952, Serial No. 277,792. Divided and this application November 10, 1952, Serial No. 321,825

Claims priority, application Germany March 22, 1951

3 Claims. (Cl. 266—20)

This invention relates to the roasting of sulfide ores. In particular, the invention is directed to the roasting of sulfide ores while suspended in a fluidized bed or a gas stream.

Heretofore when sulfide ores were roasted in a gas stream, the ores were first placed on a sieved bottom deep pit furnace, and the ores were then suspended and swirled by an upwardly directed air stream. The air velocity and ore particle size were so adjusted to each other so that the least possible amount of solid material was carried away by the air stream escaping from the suspended material. The disadvantage has existed in that furnaces of this type could only be used for ores which developed only a small amount of heat of reaction during the roasting process, as the high temperatures developed in the heat of reaction would cause certain ores to sinter and fuse into slag. No means was known to remove undesirable heats which ranged above the temperature of from 900° to 1000° C.

The objects of the instant invention are to develop an apparatus for roasting sulfur-containing ores, especially sulfide ores suspended in a gaseous medium, without the danger of overheating and sintering; to produce an apparatus for roasting sulfide ores in which the heat of reaction is removed before sintering temperatures are encountered, and to produce an apparatus for roasting ores suspended in a gaseous medium which apparatus will prevent the heating from arising to excessive temperatures, and which is of less height than the conventional deep pit furnaces.

In general, these objects of the invention are obtained by suspending the sulfide ores in a gaseous medium which increases from a relatively small cross-sectional area, in a direction upwardly to a greatly increased cross-sectional area. As the roasting gases are introduced at the smaller cross-sectional area, and expand as they rise, the excess temperatures of the reaction heat of the roasting process are compensated for and removed by the expansion of the roasting gases. The apparatus for effecting this process consists of a generally inverted conical or wedge-shaped structure with the roasting gases introduced at the lower narrow section of the structure. In addition, cooling jackets, or other cooling means can be applied to the exterior walls of the furnace for assisting in the removal of excessive heat. Furthermore, in accordance with the invention, a plurality of relatively small furnaces can be produced in an assembly with common cooling means for the various units, this giving better control of the individual units, while maintaining the advantages of compactness. The invention is particularly applicable to the roasting of pyrites and zinc blend ores.

The means by which the objects of the invention are obtained are more fully described with reference to the accompanying diagrammatical drawings, in which:

Figure 1 is an isometric view of a single unit furnace constructed according to the invention;

Figure 2 is a cross-sectional view through a multiple unit furnace constructed according to Figure 1;

Figures 3, 4:
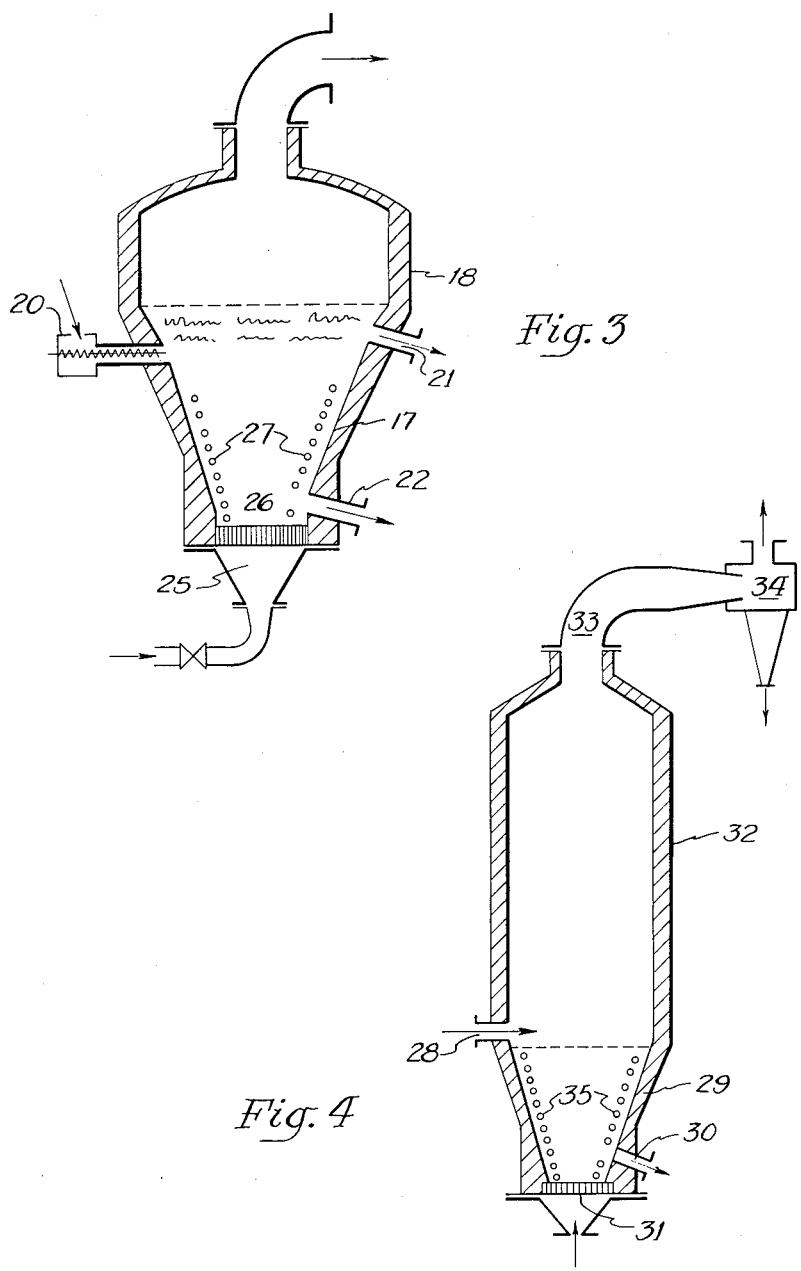
Figure 3 is a cross-sectional view through a cylindrical type furnace.
Figure 4 is a cross-sectional view through another embodiment of a cylindrical type furnace.

As seen in Figures 1 and 2, the furnace is composed of a rectangular section 1, beneath which lies a wedge-shaped section 2, the side walls of which converge downwardly. The roasting gas medium is introduced through nozzles in the bottom 3 of section 2, gas being supplied from manifold 4. Ore to be roasted is introduced through an opening 5 in one end wall of section 2, the roasted ore being removed through opening 6 in the opposite end wall. The furnace may be surmounted by a cover or hood 7 provided with a stack 8. Additional cooling air can be introduced into the hood by means of pipe 10.

The section 2 of the furnace is surrounded by a cooling jacket 9. The cooling medium can consist of air, water, steam, or gases. Air for manifold 4 can be preheated in jacket 9. Furthermore, the cooling medium can consist of materials which can be heated to high temperatures without developing undesirable vapor pressures, such materials being fused salts, molten metals, high boiling point oils, and the like.

In the operation of the furnace according to Figure 1, the ore is charged into the furnace through opening 5, and the gaseous medium is introduced through nozzles 3. The pressure of the gas is such as to suspend the particles of ore in the lower section 2 of the furnace, and is adjusted so that its linear velocity in section 1 lies between 0.6 and 1.5 m./sec. The ore is swirled around and roasted in section 2. As the gases rise from nozzles 3, they expand in the increased cross-section, and help take up the heat of reaction. Suspended particles in the gas will settle out as the swirling of the gases is quieted as they pass through section 1 of the furnace, and the gases may be further cooled by means of cold air introduced through pipe 10. Additional cooling is provided through cooling jacket 9 along the long sides of section 2 so that the temperature of the roasting can be kept below the point where sintering and the formation of slag would take place.

The elongated wedge-shaped cross-section of the furnace has further advantages in that the elongated sides define an increased cooling surface over and above a rectangular or cylindrical furnace. This permits the introduction of ore through one narrow end of section 2 and discharge through the other narrow end. A further advantage is obtained by this construction inasmuch as the gas pressure through nozzles 3 can be adjusted so that it is higher on the charging side and the material entering through opening 5 is carried over in a swirling motion toward opening 6. This effectively forms a bed of roasted material having a downgrade from opening 5 to opening 6, and furthermore permits a relatively rapid transit of the material through the furnace so that raw material can be continuously fed into the furnace, and roasted material continuously extracted therefrom. No cooling jacket is necessary for section 1.

This form of the furnace adapts itself to multiple units as shown in Figure 2. The size of an individual unit depends upon the degree of fines in the ore, and the heat properties of the same. The greater the particle size, the greater the air pressure needed to produce a swirling action in the roasting bed. Consequently, a very large pressure will be needed for a comparatively large roasting bed, and consequently a greater amount of heat needs to be extracted. Such disadvantages are eliminated by the use of a plurality of small units as shown in Figure 2 where the various units 11 are located side by side and provided with common cooling jackets 12. The gas introduced through nozzles 13 can be collected into a common section 14 and removed through stack 15. The ores can be introduced into each unit as shown for Figure 1. In this manner, pyrite ores in which 90% of the particles are 1.5 mm. in diameter or less, can be roasted in a furnace in which the top surface of each individual unit 11 is 1 by 3 meters.

The invention is adapted to the so-called cylindrical type furnace, by following the principle that the ores are swirled in a conically shaped vessel with the roasting gases being fed through the apex end of the downwardly directed cone, such as shown in Figure 3. The furnace consists of a lower conical section 17 surmounted by an upper cylindrical section 18. The raw ore is introduced through a screw conveyor 20 and is discharged through either the opening 21 or the opening 22. The roasting gas is supplied through pipe 25 into the roasting chamber through nozzle grate 26. The roasting chamber contains cooling pipes 27 adjacent the walls of conical section 17. The pressure of the roasting gas is such as to keep the swirling gas within conical section 17. This furnace may have the following proportions: height, 3.0 m., cross-sectional area at the top of nozzle grate 26, 0.25 m.$^2$, area through the midsection of section 17, 0.5 m.$^2$, and area at the top of section 17, 2.0 m.$^2$.

A further form of a so-called cylindrical type furnace is shown in Figure 4 where the raw ore is introduced into the furnace through opening 28 which lies immediately above the conical section 29, the roasting ore being withdrawn through port 30. The roasting gas is introduced through nozzle grate 31, the roasting gas being collected in cylindrical chamber 32, and being exhausted through pipe 33 into a cyclone dust separator 34. In the conical section 29 are pipes 35 for holding the cooling fluid. The ores are suspended in the conical section 29 in accordance with the principle of the invention. In the cylindrical section 32, ore particles of very fine size are suspended in the roasting gas. The finer the particles, the higher they will be carried in chamber 33, and only the smallest of the particles are carried into the separator 34.

Figure 5:
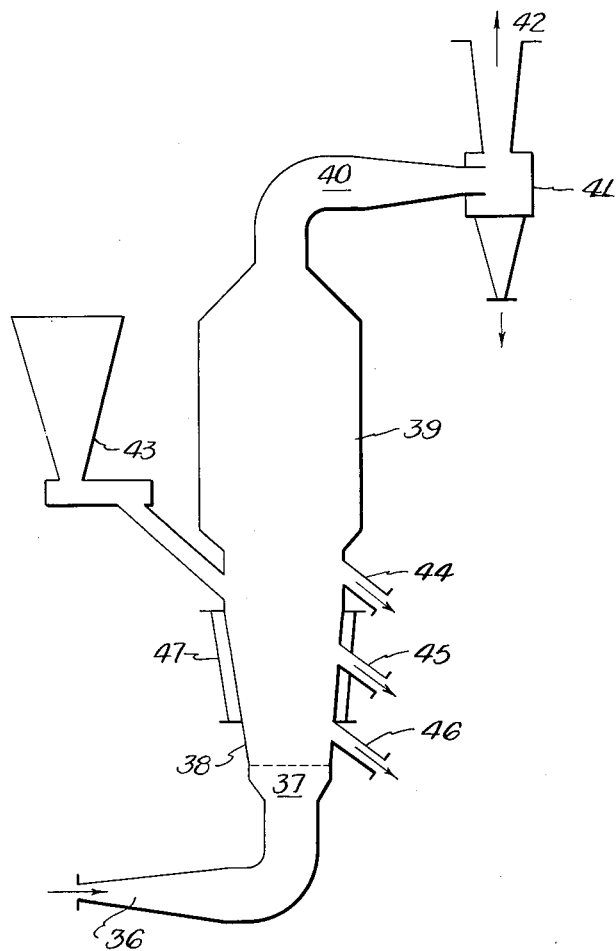
Figure 5 is a cross-sectional view showing a further form of the furnace.

In Figure 5, the apparatus is composed of a gas inlet 36 which passes through a sieve bottom 37 in the lower portion of the tapered or conical section 38. The upper section 39 has a greater cross-sectional area than the top of lower section 38. The ore is fed into conical section 38 from hopper 43, the roasted ore being selectively discharged through openings 44, 45 and 46. A cooling jacket 47 surrounds the conical section 38. As the ores enter chamber 38, they are vigorously whirled and kept in suspension. The ore particles have an upwardly directed velocity component. The increased cross-section of chamber section 39 results in a reduction of the upper rising velocity. However, a proportion of the suspended ore particles is carried through the exhaust conduit 40 into the cyclone-type separator 41, the cleared gas being discharged through the stack 42 while the particles settled are collected in the lower portion of the apparatus.

In the apparatus of Figure 5, pyrites can be roasted to give a high quality yield at a high rate of production. The roasted ore is removed either continuously or intermittently from the discharge ports 44, 45 and 46. In an apparatus constructed according to Figure 5, the cross-sectional area of the top of section 38 was 2 m.$^2$. The furnace was charged with 1.6 metric tons per hour of pyrite ore with 45% sulfur content and 2.5% moisture. Air was fed through pipe 36 under a pressure of 400 mm. water at a rate of 2500 m.$^3$ per ton of ore at a temperature of 20° C. The roasting gas contained 12.5% $SO_2$ by volume. In the cooling jacket 47, 650,000 cal. per hour were removed from the walls of the chamber 38 so that the roasting temperature was held at 1,000° C. No slag formation was observed. The roasted ore contained particles up to 7 mm. in diameter. The coarsest particles of the roasted ore were removed through port 45. The sulfur content in the roasted ore was about 0.9%.

This application is a division of our application for Roasting Sulfide Ores, S. N. 277,792, filed March 21, 1952.

Having now described the means by which the objects of the invention are obtained, we claim:

1. An apparatus for roasting sulfidic ores developing temperatures during the heat of reaction which would cause sintering comprising a furnace having downwardly converging elongated side walls, end walls, and a bottom extending between said walls, means for introducing ore into said furnace through the upper portion of one end wall, means for introducing gas into said furnace through said bottom for suspending said ore in a fluidized bed while it is being roasted, means for circulating a cooling medium adjacent the walls to cool the ore to sub-sintering and sub-slag forming temperatures, and means for removing treated ore from the furnace through the lower portion of the opposite side wall.

2. An apparatus as in claim 1, further comprising a rectangular gas collecting hood mounted on said walls.

3. An apparatus as in claim 1, further comprising a multi-unit furnace composed of several individual furnace units arranged parallel to each other, a gas collecting hood common to and extending over said furnace units, and said cooling medium circulating means being common to said furnace units.

References Cited in the file of this patent

UNITED STATES PATENTS

| | | |
|---|---|---|
| 2,042,576 | Bacon | June 2, 1936 |
| 2,371,619 | Hartley | Mar. 20, 1945 |
| 2,404,944 | Brassert | July 30, 1946 |
| 2,637,629 | Lewis | May 5, 1953 |
| 2,665,899 | Fassotte | Jan. 12, 1954 |

FOREIGN PATENTS

| | | |
|---|---|---|
| 645,977 | Great Britain | July 30, 1948 |
| 494,961 | Belgium | Apr. 29, 1950 |
| 668,119 | Great Britain | Mar. 12, 1952 |